United States Patent [19]

Pollin

[11] Patent Number: 5,966,698
[45] Date of Patent: Oct. 12, 1999

[54] AUTOMATED PAYMENT SYSTEM AND METHOD

[76] Inventor: Robert E. Pollin, 19107 Grotto La., Germantown, Md. 20874

[21] Appl. No.: 08/625,844

[22] Filed: Apr. 1, 1996

Related U.S. Application Data

[63] Continuation-in-part of application No. 07/959,930, Oct. 15, 1992, Pat. No. 5,504,677.

[51] Int. Cl.⁶ .................................................. G06F 17/60
[52] U.S. Cl. .............................. 705/34; 705/17; 705/30; 705/33; 705/44; 705/45; 283/67; 382/119
[58] Field of Search ................... 705/17, 30, 33, 705/44, 45; 283/67; 382/119

[56] References Cited

U.S. PATENT DOCUMENTS

| | | | |
|---|---|---|---|
| Re. 32,985 | 7/1989 | Nagata et al. | |
| 4,321,672 | 3/1982 | Braun et al. | D11/157 |
| 4,381,705 | 5/1983 | Roes et al. | 101/69 |
| 4,385,285 | 5/1983 | Horst et al. | 382/119 |
| 4,494,127 | 1/1985 | King | 346/82 |
| 4,623,965 | 11/1986 | Wing | 705/33 |
| 4,630,201 | 12/1986 | White | 705/44 |
| 4,758,714 | 7/1988 | Carlson et al. | 235/380 |
| 4,810,866 | 3/1989 | Lord, Jr. | 235/379 |
| 4,823,264 | 4/1989 | Deming | 705/39 |
| 4,948,174 | 8/1990 | Thomson et al. | 283/58 |
| 4,960,981 | 10/1990 | Benton et al. | 705/41 |
| 4,974,878 | 12/1990 | Josephson | 283/67 |
| 5,051,900 | 9/1991 | Ito et al. | 705/43 |
| 5,053,067 | 10/1991 | Carlson et al. | 62/624 |
| 5,053,607 | 10/1991 | Carlson et al. | 705/18 |
| 5,085,470 | 2/1992 | Peach et al. | 283/58 |
| 5,111,395 | 5/1992 | Smith et al. | 705/45 |
| 5,117,355 | 5/1992 | McCarthy | 705/14 |
| 5,121,945 | 6/1992 | Thomson et al. | 283/58 |
| 5,126,945 | 6/1992 | Champion et al. | 364/468.05 |
| 5,233,547 | 8/1993 | Kapp et al. | 364/705.02 |
| 5,237,159 | 8/1993 | Stephens et al. | 705/30 |
| 5,265,007 | 11/1993 | Barnhard et al. | 705/45 |
| 5,326,959 | 7/1994 | Perazza | 235/379 |
| 5,383,113 | 1/1995 | Kight et al. | 705/40 |
| 5,491,325 | 2/1996 | Huang et al. | 705/45 |

OTHER PUBLICATIONS

Dans, Ronald, "Direct Debiting—An Alternative To Credit Card Processing," *Telemarketing Magazine*, pp. 46–47, Aug. 1991.

Dans, Ronald, "New Credit Card Processing Nightmare for Telemarketers . . . And One Partial Solution," *Teleprofessional Magazine*, pp. 18–19, Sep. 1991.

(List continued on next page.)

*Primary Examiner*—Allen R. MacDonald
*Assistant Examiner*—Jagdish Patel
*Attorney, Agent, or Firm*—Greenberg Traurig; Evan R. Smith

[57] ABSTRACT

A system and method of collecting payments uses an automated system to generate a draft, payable to the creditor and drawn on the payor's checking account, pursuant to the payor's authorization. The draft is then executed by the debt collector as authorized signatory for the payor, and deposited into the payee's account to complete payment. The automated system has an input screen which shows necessary information for generation of the draft, and may be read to the system operator over the telephone by the authorizing payor. When verification is complete, the system generates a paper bank draft payable to the payor, using MICR ink so that the draft can be processed in the banking system like an ordinary check. The signature block of the draft is made for the collection agent "as authorized signatory for" the payor. The system provides for an authorization code to be given to a client system to permit printing of a specified additional number of checks. The client system includes an indicator which is activated when a remaining number of authorized number of checks is running low. Client instructions are also recorded when requesting an authorization code, and a recording is made of a location on a recording medium of the recorded authorization. The system provides for automatically producing a deposit slip for depositing a plurality of checks.

8 Claims, 11 Drawing Sheets

OTHER PUBLICATIONS

Maturi, Richard J., "Running A Better Business," *Entrepreneur Magazine,* pp. 214, 216–217, Jul. 1992.
Westcorp Sofware Systems, Inc., Micro Pro Series Brochure.
Acuprint letter of reseller Direct Check, Inc. Brochure
Letter of Jul. 27, 1993 from Jones, Tullar & Cooper, PC Regarding pending patent application of Robert Pollin.
The Nilson report, Month of Jun. 1993, Issue 550 Collection Software Brochure.
Letter of Jul. 11, 1991 to Byrd & Forrest Collection Agency from Robert Pollin.
Letter of Jul. 30, 1991 to Doctors Credit Service, Inc., from Robert E. Pollin.
Auto–Pay Schedule of fees for collection agencies.
Sample Check .
Copy of an Agreement.
Copy of an Auto Pay Brochure.
Brochure: Freedom From Telecom Support Systems.
Brochure: International Banking Technology.
"Germantown Firm Charges Ahead With Automatic Payment Program," *Germantown Gazette*.
Check by phone materials.
Fidelity Check Incorporated, Letter to prospective client.
Dans, Ron, QuickCard Systems, promotional leeter, 3 pages, dated Sep. 01, 1990.
Protest filed by Mr. Shawn J. Noel on or about Jul. 20, 1994.
Protest filed by Shawn J. Noel on or about Sep. 16, 1994.
Protest filed by Mr. Donald Pette, Jr., of Direct Check, Inc. on or about Sep. 21, 1994.
Protest filed by Attorney William A. Blake on or about October 26, 1994, assumed to be on behalf of Mr. Ronald Dans [hereinafter Dans Protest].
Defendant's Expert Report, Michael J. Franklin, Nov. 11, 1997.
Memorandum Opinion, Frederic N. Smalkin, United States District Judge, Mar. 5, 1998.

******AUTO-PAY(TM) CHECK ENTRY******

Check # : 9999

Date: 10/07/92

FIRST: ROBERT MID: E LAST: POLLIN
FIRST: MID: LAST:
ADDR: 6600 MICHAELS DRIVE
CITY: HARRISBURG STATE: PA ZIP: 17112
PHONE1: (301) 353-1520
PHONE2: ( ) -
Pay to the order of:

Oxford Capitol Corp.

Amt $ 181.00 Check Number Position: L

Bank: MARYLAND FEDERAL SAVINGS &

City/ST: HYATTSVILLE, MD

Memo: DOCTOR BILL #35353A

ABA Number: 255072249

Account Number: 1589080393

Enter Check Information. Press <ESC> to Exit

FIG. 4

******AUTO-PAY(TM) CHECK ENTRY******

Check #: 9999

Date: 10/07/92

FIRST: ROBERT       MID: E     LAST: POLLIN
FIRST:              MID:       LAST:
ADDR:  6600 MICHAELS DRIVE
CITY:  HARRISBURG            STATE: PA   ZIP: 17112
PHONE1: (301) 353-1520
PHONE2:           -
Pay to the order of:

Oxford Capitol Corp.

Bank:    MARYLAND FEDERAL SAVINGS
City/ST: HYATTSVILLE, MD
Memo:    DOCTOR BILL #35353A

A

PAYMENT NUMBER: 2
Enter future payment information:
DATE       AMOUNT      CHECKNUM
---        ---         ---
09/23/93   50.00       1234

Enter Check Information

FIG. 5

FIRST: MID. LAST: ********AUTO
FIRST: MID: LAST:
ADDR:
CITY:
PHONE1: ( ) -
PHONE2: ( ) -
Pay to the order of:

THE NUMBER YOU HAVE ENTERED:
287474744
DOES NOT CURRENTLY EXIST AS
A VALID ABANUM. YOU MAY ENTER
IT ANYWAY IF YOU ARE CERTAIN
OF ITS ACCURACY.

Press any key to continue

/92

Oxford Capitol Corp.    Amt $    0.00

Bank:                   Check Number Position: R
City/ST:                ABA Number:    Account Number:
Memo:                   287474744

Enter Check Information. Press <ESC> to Exit

FIG. 6

**********AUTO

FIRST: MID. LAST:
FIRST: MID: LAST:
ADDR:
CITY:
PHONE1: ( ) —
PHONE2: ( ) —
Pay to the order of:

THE ZIPCODE YOU HAVE ENTERED:

DOES NOT CURRENTLY EXIST AS
A VALID ZIPCODE. YOU MAY ENTER
IT TO THE ZIPCODE DATABASE FROM
THE SYSTEM UTILITIES MENU.

Press any key to continue

Oxford Capitol Corp. /92

Amt $ 0.00

Bank: Check Number Position: R
City/ST: ABA Number: Account Number:
Memo:

Enter Check Information. Press <ESC> to Exit

FIG. 7

AUTOMATED PAYMENT SYSTEM AND METHOD this application is a continuation-in-part of application Ser. No. 07/959,930, filed Oct. 15, 1992 now U.S. Pat. No. 5,504,677.

FIELD OF THE INVENTION

The present invention relates to systems and methods for collecting payments using an automated draft printing system operated by a payment collector.

BACKGROUND OF THE INVENTION

The effective operation of the modern economy depends on the ready availability of payment mechanisms by which funds can be transferred between parties. A number of mechanisms have been available for use both at the point of sale and for collection of debts relating to earlier sales. At the point of sale, the most popular payment mechanisms in recent times have been cash, personal checks, and bank-issued credit cards, including MasterCard (TM), VISA (TM), Discover (TM), and American Express (TM). Other methods of payment include store-issued credit accounts, bank account debit cards, Cash-on-Delivery (COD), and contracted payment plans in which the customer agrees to pay for goods or services according to a predetermined schedule.

Cash in advance is the only one of these methods that is not subject to a later non-payment or revocation which would prevent the merchant from collecting the amount due. Personal checks may be returned for insufficient funds and are subject to stop payment orders by the maker. Credit card sales are subject to federal laws which permit non-payment or at least a considerable delay of payment if the customer indicates dissatisfaction with the quality of goods or services rendered. The issuers of credit cards, credit accounts, and payment plans run the risk that the credit bill, even if not disputed, will not be paid according to the credit agreement. Debit card sales are subject to federal electronic funds transfer regulations which make it possible under some circumstances to later disallow a transaction. Cash-on-delivery transactions may be rejected by the purchaser at the time of delivery, leaving the seller to absorb the cost of the failed delivery. While some refusals of payment are the result of a legitimate dispute between the buyer and seller, many of these cases are a breach of the customer's duty to pay. Losses from bad debts must be absorbed by the merchant and passed along to future customers. Thus, most merchants might prefer to collect from their customers in cash.

However, the risk of loss inherent in carrying large amounts of cash discourages many people from carrying cash and using it to pay for more expensive goods and services. Also, when goods or services are to be delivered at a later time, customers do not wish to pay in advance and thereby assume the risk of default or bankruptcy of the seller before the goods or services are delivered. Finally, in many cases the customer does not have the funds to make the purchase, and needs to finance the purchase by borrowing. For these reasons and others, these alternative payment mechanisms have collectively become much more popular than paying cash in advance and merchants necessarily offer alternative payment methods.

Various systems have been developed to reduce the risk to merchants in accepting checks or other non-cash instruments. For example, U.S. Pat. No. 5,053,607 to Carlson et al. shows a point-of-sale system for verifying availability of funds so the merchant can determine whether to accept a check. Of course, such systems do not guard against a subsequent stop payment order being issued by the customer.

The popularity of these "promises to pay" has also resulted in the growth of an entire collection industry devoted to finally collecting debts represented by checks, credit accounts, and payment agreements in cases where the debts have not been timely paid.

When a debt goes unpaid, a merchant or credit issuer may hire a collection agency to seek recovery of the debt. The collection agency generally contacts the debtor repeatedly by phone and/or mail in an attempt to obtain payment. Generally, the collection agencies try to persuade the debtor to mail a check to the collection agency in payment of the debt. Of course, debtors often put off payment with the oft-used line "the check is in the mail." Even if a check is received, it is subject to dishonor as noted above. Collection agencies may also accept credit cards, but many debtors do not have credit cards or do not have sufficient credit to pay the amount due using a credit card. Also, a wire service is offered by Western Union (TM), for example, which allows persons to pay by cash or check at a remote location and have the funds transferred to the collection agency, for a substantial fee. This system requires that the debtor physically go to a wire transfer office to pay, and is less desirable and effective for that reason.

Because of the substantial manual effort involved in repeatedly contacting a debtor, collection agencies are often paid in the form of a substantial percentage of the amounts collected. Again, this represents a loss to the merchant which must be recovered through increased prices to future customers.

As noted above, one particular type of debt that often causes collection problems is an agreement to make scheduled payments. A variety of goods and services, such as automobiles, homes, major dry goods, and health club memberships, are often purchased on payment plans. Because of the repeated nature of the payments, it is possible that even the most diligent payor may, at some point, forget to mail a payment or send it late. Also, while the mail system in developed countries such as the United States achieves a very high delivery rate, it is statistically inevitable that some mailed payments will not be delivered.

One solution to the problems of reliably collecting repeated payments is a pre-authorized electronic debit. Many large and well-connected creditors, such as banks and the finance arms of automobile manufacturers, generate monthly tapes of authorized payments which are then processed electronically within the banking system. Funds are withdrawn from the checking account of the consumer and transferred directly to the creditor. This service has recently been made available to smaller accounts with a substantial per-transaction charge. However, this electronic banking system is primarily adapted for processing pre-authorized transfers on particular predetermined dates, and deposits therefore cannot be processed entirely at the convenience of the parties. A connection with a bank is needed, which either involves obtaining and maintaining a direct connection or the use of a transaction processing company. Also, such electronic funds transfers cannot be authorized by telephone; a written authorization is legally required, so that immediate authorized collection of a debt cannot be accomplished by this method.

Other automated payment systems have been developed, but do not achieve the advantages of the present invention.

U.S. Pat. No. 5,121,945 to Thomson et al. shows a system for generating regular checks, such as for the payment of utility bills, on customer accounts using a laser printer with a magnetic toner cartridge. Using stored account information, an authorized check to the payee is generated by the central system and transmitted to the payor for approval, signing, and return. While this system may be advantageous for the limited purpose disclosed, it does not provide a system in which transfers are authorized by telephone and executed without mail delays.

U.S. Pat. No. 4,823,264 to Deming shows a system in which a customer can electronically pay bills using a computer. The customer's computer transmits an order to pay a bill to a central location, and a paper draft is generated for transmission to the payee. Funds availability may be verified before generation of the draft. This system requires that the debtor have particular computer equipment, and would therefore be ineffective in generalized debt collection situations.

U.S. Pat. No. 4,960,981 to Benton et al. discloses a method and system for transferring funds in which the customer's signed order to pay is transmitted to the bank by fax. The bank's fax receiver is equipped with character recognition equipment which takes the necessary information from the order, after which the system verifies funds availability and makes the payment requested if the funds are available. This system can only be used in cases where the bank involved has the required special equipment and the customer is present to sign the payment instructions.

Therefore, the inventor believes there is a need for an improved system and method for collection of debts which can be used for immediately debiting a debtor's bank account when the debtor authorizes this collection method by telephone.

SUMMARY OF THE INVENTION

Therefore, it is a general object of the present invention to provide a method for collecting funds from a customer's checking account when authorized, without requiring that an executed check be mailed to the payee.

It is another object of the present invention to provide a method for providing an authorization code to a client system, to permit the authorized printing of a specified additional number of checks.

It is a further general object of the present invention to provide a system which facilitates authorized generation of a payment order for transfer of funds from a customer's checking account.

It is another object of the present invention to provide a method for providing a method for providing a client system with an indication that a remaining number of authorized number of checks is running low.

Another object of the present invention is to provide a system for generating authorized drafts on a plurality of financial accounts belonging to a plurality of payors.

A further object of the present invention is to provide a system for generated authorized drafts which receives input information sufficient to generate a draft, and which processes the information to produce a draft to be executed by an authorized agent for the payor.

It is another object of the present invention to provide a method for recording client instructions requesting an authorization code, and recording of a location on a recording medium of the authorization itself.

Another object of the present invention is to provide a stand-alone system for producing drafts on a plurality of accounts, wherein the system includes a laser printer using an MICR toner cartridge.

A further object of the present invention is to provide system for producing drafts on a plurality of accounts belonging to a plurality of persons which receives input information and verifies the information to prevent generation of nonnegotiable drafts.

Yet another object of the present invention is to provide a system for automatically producing drafts which verifies input bank routing code information by comparing the information to a database of bank identification information.

A further object of the present invention is to provide a system for automatically producing drafts which verifies the probable validity of an account number identifying a financial account.

Another object of the present invention is to provide a draft producing payment system that identifies high risk drafts and provides an increased level of verification for such drafts.

A further object of the present invention is to provide a scheduling system for automatically scheduling the future production of drafts, including a predetermined limited sequence of drafts or a series of periodic drafts.

Still another object of the present invention is to provide a system which automatically generates authorized drafts and which further automatically generates a verification notice to the person authorizing the drafts.

Another object of the present invention is to provide a geographically dispersed system for processing drafts in which a plurality of data collection stations are connected to a central draft production system which generates the drafts.

It is another object of the present invention to provide a method for automatically producing a deposit slip for depositing a plurality of checks.

Another object of the present invention is to provide a draft production system which has security measures associated with it to reduce the likelihood of production of unauthorized drafts.

A more particular object of the present invention is to provide a draft production system which is designed to produce drafts payable only to a predetermined party, such that the name of the party cannot be readily changed by a user of the system.

Another object of the present invention is to provide a process for receiving payments in which an automated draft production system is provided to produce authorized drafts on the account of a payor, executable by a person other than the payor.

It is also an object of the present invention to provide a process for collecting a payment in which a payor authorizes withdrawal of funds from the payor's checking account, for example by telephone, a draft is generated using an automated draft production system, negotiability of the draft is verified, the draft is executed on behalf of the payor, and deposited to the account of the payment collector.

Still another object of the present invention is to provide a process for collecting payments in which a payor authorizes withdrawal of funds from the payor's checking account, for example by telephone, a draft is generated using an automated draft production system, the draft is executed on behalf of the payor, and deposited to the account of the payment collector, in which the authorizations are received at a plurality of geographically dispersed locations and transmitted to a central service location for generation of the drafts.

Other objects of the present invention will be apparent to those skilled in the art upon review of the specification, drawings, and claims of the present invention.

These objects and others are achieved according to the present invention by providing a system and method of collecting debts in which an automated processing system generates a draft, payable to the creditor and drawn on the debtor's checking account, pursuant to the debtor's authorization. The draft is then executed by the debt collector as authorized signatory for the debtor, and deposited into the creditor's account. The automated system used to generate the drafts in the preferred embodiment has a simple input screen which receives the necessary information for generation of the draft, which in the preferred scenario is read to the system operator over the telephone by the debtor who has authorized the payment. The system then immediately verifies the bank and account information by comparing the input information to the data in a bank information database associated with the system. This verification process ensures that any errors in transmission of the account identification information can be rectified during the conversation with the debtor. Optionally, after verifying the account information, the system may generate an inquiry to the bank to determine the availability of funds in the debtor's account. When all verification is complete, the system generates a paper bank draft payable to the creditor, using MICR ink so that the draft can be processed in the banking system like an ordinary check. The signature block of the draft is made for the collection agent "as authorized signatory for" the debtor. In this manner, it is possible to obtain authorization for payment of a debt in a telephone conversation with the debtor and to immediately deposit the debtor's authorized draft to begin the payment process, without depending on the debtor and the mail system to deliver a signed payment order to the creditor's collection agent.

This system and method is particularly advantageous in automating the processing of debts by collection agencies, and as a payment alternative to credit cards and COD deliveries for goods and services ordered by telephone. Finally, this system and method can be used advantageously for regular payment generation by businesses whose pre-authorized payments are not regular enough to justify regular mass electronic funds transfers.

BRIEF DESCRIPTION OF THE DRAWINGS

FIG. 4 is a representation of the main data entry screen according to the preferred embodiment of the invention;

FIG. 5 is a representation of the screen display when postdated draft instructions are entered in the system;

FIG. 6 is a representation of the screen display showing an error message indicating an invalid bank identification number;

FIG. 7 is a diagram of the screen display showing a zip code error message;

DETAILED DESCRIPTION OF THE PREFERRED EMBODIMENTS

In general, as described above, the present invention provides a system and method of collecting payments in which an automated system generates a draft, payable to the payee and drawn on the payor's checking account, pursuant to the payor's authorization. The draft is then executed by the payee's collector as authorized signatory for the payor, and deposited into the payee's account. The automated system used to generate the drafts in the preferred embodiment has a simple input screen which receives the necessary information for generation of the draft, which in a typical scenario will be read to the system operator over the telephone by the payor who is authorizing the transfer. The system then immediately verifies the bank and account information by comparing the input information to the data in a bank information database associated with the system. This verification process ensures that any errors in transmission of the account identification information can be rectified during the conversation with the payor. Optionally, after verifying the account information, the system may generate an inquiry to the bank to determine the availability of funds in the payor's account. When all verification is complete, the system generates a paper bank draft payable to the creditor, using MICR ink so that the draft can be processed in the banking system like an ordinary check. The signature block of the draft is made for the collection agent "as authorized signatory for" the payor. In this manner, it is possible to obtain authorization for payment of a debt in a telephone conversation with the payor and to immediately deposit the payor's authorized draft to begin the payment process, without depending on the payor and the mail system to deliver a signed payment order to the payee's collection agent.

Figure 1:
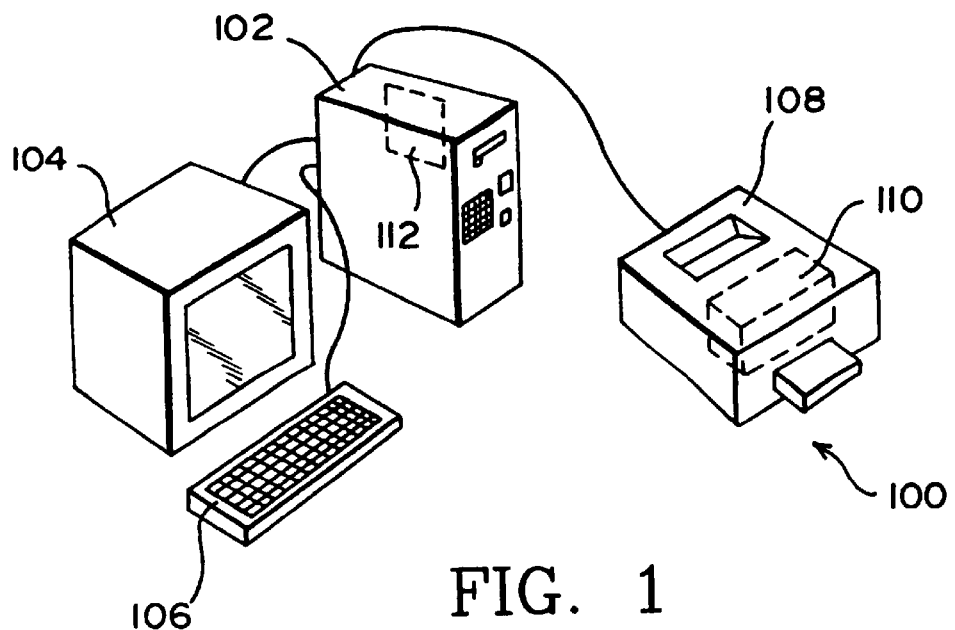
FIG. 1 is a diagram of the hardware used in a preferred embodiment of the present invention to generate drafts on a customer bank account.

Referring first to FIG. 1, the present invention is implemented, in a first preferred embodiment, using a localized computer system 100 comprising a personal computer 102 and a display screen 104, keyboard 106, and printer 108 connected to personal computer 102. Printer 108 is preferably a laser page printer such as any of the printers sold under the trademark Laserjet (TM) by the Hewlett-Packard company. Printer 108 operates using a toner cartridge 110 installed in printer 108, and the toner cartridge is of the type which prints with magnetically charged ink which can be read by Magnetic Ink Character Recognition (MICR) equipment used by the banking system's automated check clearing centers. These MICR toner cartridges can be obtained from a number of sources, for example LaserScript division of Matrix Technology, Inc., 7129 Banjo Ct., Columbia, Md. 21045; or MICR Tech Group, Inc., P.O. Box 152, Brownstown, Ind. 47220. The cartridge used should be one selected for compatibility with the brand and model of printer 108 being used. Personal computer 102 may be an IBM (TM) compatible personal computer incorporating an INTEL 80X86 (TM) microprocessor and running the Microsoft MS-DOS (TM) operating system or another of the various operating systems adapted to work on this class of computer. Of course, those skilled in the art will appreciate that the system can also be implemented on a variety of personal computers, minicomputers, or mainframe computers, using a variety of printers, and the invention is not limited to the particular hardware disclosed in this preferred embodiment.

The system 100 can be operated with a single input workstation as shown or multiple input workstations can be provided. If multiple input workstations are used, the software in the system will be designed for multiuser access. For example, record locking protocols may be implemented.

The computer 102 is optionally provided with a fax modem 112 which can be installed internally in computer 102 and is connected to an outgoing telephone line (not shown). Fax modem 112 may be a JT FAX Board made by Hayes Microcomputer Products, Inc. of Atlanta, Ga. Fax modem 112 permits software operating in computer 102 to electronically generate fax images and to subsequently dial a remote fax machine and transmit the image to the remote machine. As will be explained in more detail later, this fax modem may be used in the preferred embodiment of the present invention to generate and deliver a letter of inquiry to the debtor's bank to determine whether the debtor's account is in good standing and has sufficient funds to make payment on an authorized draft.

The system disclosed herein can be advantageously used as part of a debt collection process in which the debtor is contacted by a collection agent over the telephone and, if willing to pay, is asked to authorize generation and presentation of a draft on the debtor's checking account. The debtor's name, address, telephone number, description of the debt, and the amount are typically already known to a collection agent. In the case of use of this system for mail or telephone orders of goods and services, this information will be obtained by the person receiving the order and entered in the system. The remaining input information describing the desired draft transaction, particularly the ABA number, account number, and next check number, is obtained from the debtor, usually by having the debtor read off the numbers on the bottom of one of debtor's checks. The next check number in debtor's check sequence is obtained and the debtor is instructed to destroy the existing check bearing that number. After processing by the check clearing house system, the draft generated will appear in the debtor's bank account statements as a numbered check and the paid draft will be returned to debtor with his or her other checks depending on the policy of debtor's financial institution.

For convenience, the person operating the system will generally be referred to herein as a "collection agent" and the payor will be referred to as the "debtor." However, it should be recognized that the present system and method can be used not only to collect preexisting debts, but as a payment mechanism for telephone or other sales. In this case, the person authorizing the draft will be a customer and the system operator will be an order processor. Also, for convenience the financial institution holding the debtor's account will generally be referred to as a bank, but it should be understood that this financial institution may be a savings and loan, credit union, brokerage firm, investment firm, or money market account issuer, or any other institution public or private upon which the debtor may lawfully issue an instruction to pay funds to a designated party.

Figure 3:
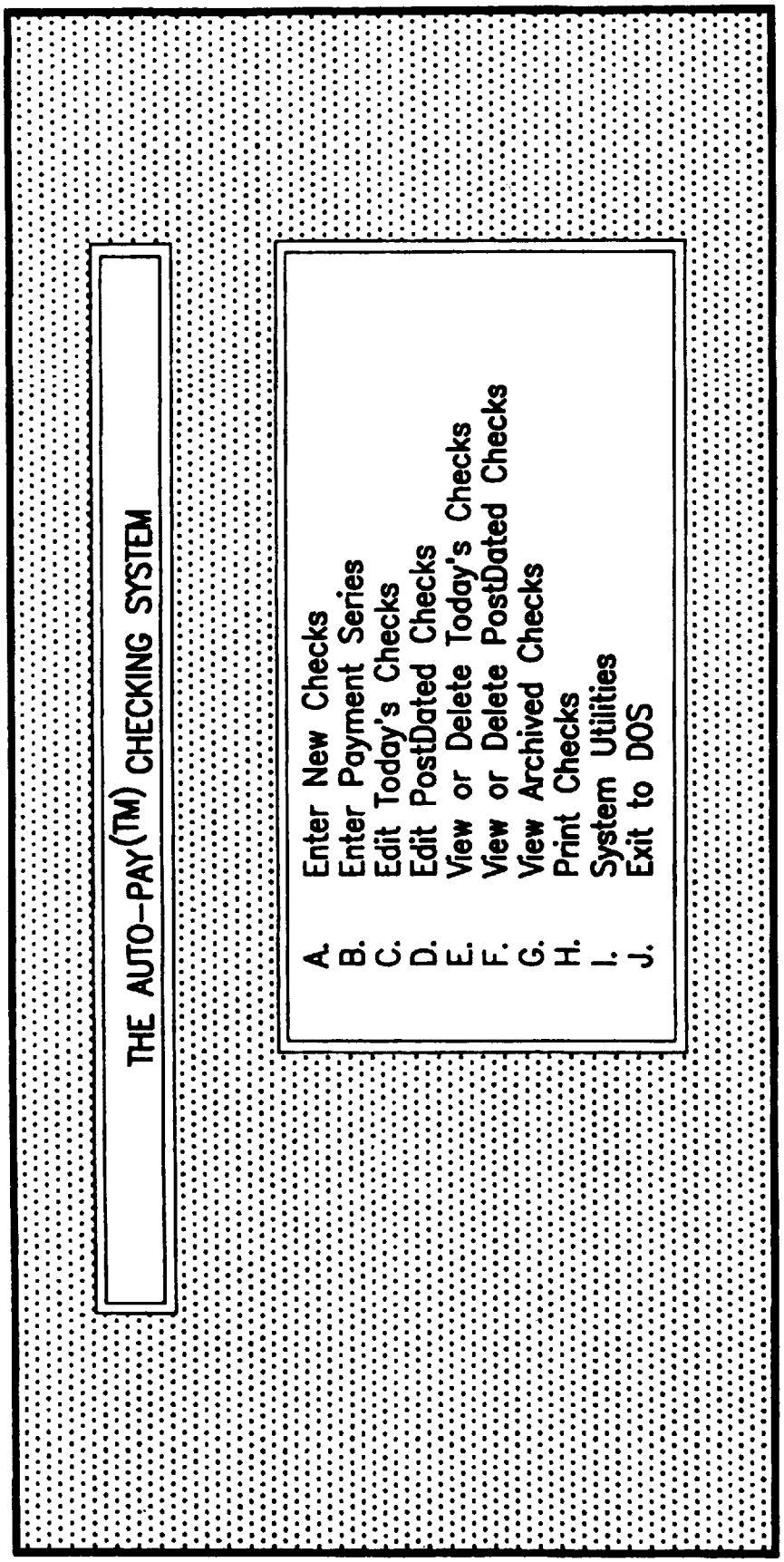
FIG. 3 is a representation of the main menu display in the preferred embodiment of the invention.

The software program operating on computer 102 is preferably menu driven. FIG. 3 shows a preferred main menu for the software program. As can be seen by reference to FIG. 3, the functions of the software accessible from the main menu preferably include entering new draft production (check) information; entering information for production of a series of drafts on the same account; editing drafts currently scheduled for production and deposit; editing drafts scheduled for future production and deposit; viewing or deleting the draft information recorded in the system; viewing records (archival information) of past drafts produced by the system; printing drafts; performing system utility functions; and ending execution of the program.

The system utilities selection on the main menu preferably produces display of a utility menu which provides a number of system management functions. For example, these functions preferably include re-indexing of databases associated with the system, data backup functions, security functions such as changing authorized passwords for system operation, updates to databases such as the zip code database and the ABA database, system configuration functions such as selecting the port to which the printer is connected, the type of printer, etc.; setup of the facsimile verification functions, purging stored records such as records of archived checks, and other desired system management functions.

Figure 2:
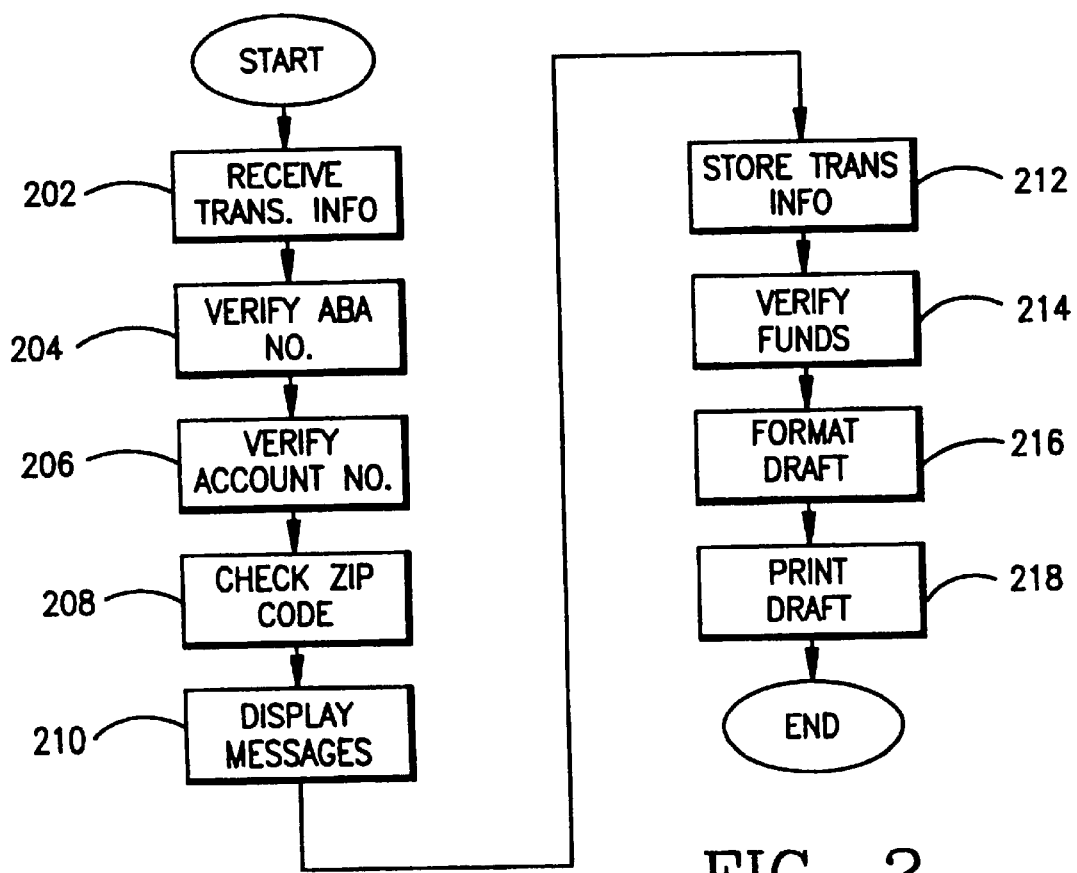
FIG. 2 is a flow chart showing a preferred embodiment of the automated collection method according to the present invention.

The software preferably operates generally according to the flow chart of FIG. 2. As shown in FIG. 2, in block 202 the necessary information to specify the draft is entered in the computer 102 as part of an information entry process, preferably during the course of the above-described telephone conversation with the debtor. Specifically, in block 202 transaction information is input into the computer 102 (shown in FIG. 1). This transaction information is preferably input using the keyboard 106 (shown in FIG. 1). In performing the step of block 202, screen 104 (shown in FIG. 1) will preferably display a data entry screen such as that shown in FIG. 4. As can be seen in FIG. 4, the transaction information preferably includes the name and address of the debtor, the next check number in sequence for the debtor's account, the date of the draft, the amount of the draft, a memo entry describing the debt, an American Banking Association (ABA) bank identification number specifying the bank or other financial institution holding the debtor's checking account, and the number of the debtor's checking account.

The information entry process in block 202 may also include the scheduling of future payments for which drafts are to be generated by the system. FIG. 5 shows a screen display which permits entering of future payments to be generated. Preferably, there are several modes for entry of future payments. In a first mode, payments of the same amount are scheduled regularly at predetermined intervals in the future, and generation of drafts will continue at the defined intervals until the system is instructed to discontinue the payments. In a second mode, one or more payments of varying amounts may be scheduled for defined dates in the future. These features are particularly useful in several situations which may be encountered by the system operator.

As a first example, when contacted regarding overdue debts, debtors frequently indicate a desire to pay at a future date when funds are expected to be available. For example, the debtor may offer to pay $50 of a $120 debt on the next Friday when the debtor will receive a paycheck, and may agree to pay the remaining $70 due two weeks later, upon receipt of his or her next paycheck. Since the system permits the scheduling of a plurality of future drafts at any desired dates, and with varying amounts, the system readily accommodates such debtor-creditor arrangements.

As a second example, the system can be used as a payment system for a sale which requires periodic payments, e.g. a health club membership for which monthly dues are paid. In this case, the purchaser may agree that a draft for a defined amount, for example $19.95 a month, will be automatically submitted on an agreed day each month in payment of dues. The system will be programmed to automatically generate this draft each month until different instructions are received. For example, if the customer wishes to discontinue the membership, the system operator would instruct the system to cease regular production of drafts on the customer's account.

As a third example, the system can be used to generate regular periodic payments of different amounts. For example, a customer of a service using this system might authorize automatic payment of monthly utility bills by the service. The payments in this case would be periodic, but the system would require entry of a varying amount for each draft to be generated. For such uses, the customer might advantageously provide a general authorization to generate periodic drafts in the amount owed each period, and this information might be automatically transferred from a billing records system to the system of the present invention to initiate generation of the drafts in the proper amount. It may frequently be desirable to interface the system of the present invention with billing, accounting, or other programs used by the payee. For example, such an interface can be accomplished by transferring batch processing or information files between the present system and the billing or accounting programs by writing the files to a mass storage device or through an interface program such as Microsoft Windows (TM).

The information entered to define future (postdated) drafts will be stored for future use as described further below with respect to block 212 of the flow chart.

As the information is entered in block 202, or immediately after entry is completed, the information given is preferably verified against appropriate databases and checking algorithms associated with the computer 102, as shown in blocks 204, 206, and 208. In block 210, any warning messages determined by the verification process will be displayed to the operator. It should be noted that the display of these warning messages is shown in a single flow chart block for convenience, and the verification functions can be performed, and the warning messages displayed, immediately after data entry has been entirely completed. However, it may also be desirable to have each data verification function performed during the information entry process, as the relevant data item is entered, and to immediately display a warning message if the item just entered is erroneous.

In conjunction with the software which performs the verification function, the databases and algorithms provided are a verification means for immediately checking the validity of the data entry.

As a first step in the verification process, the ABA number entered to identify debtor's financial institution is validated by comparison with the entries in a financial institution database having a record of each authorized ABA number, as shown in block 204 of FIG. 2. This financial institution database is preferably constructed from records which each describe a financial institution, and include the financial institution's ABA number, name, address, telephone number, and fax number. If the ABA number is found in the database, the software program displays the financial institution name and address on the screen of FIG. 4 so that the collection agent can verify the correctness of this information with the debtor. If no matching ABA number is found, a warning message will be provided to the collection agent operating the system according to the function of block 210 and as illustrated in FIG. 6. This message indicates that the ABA number is believed to be invalid. Although the system preferably provides a method for overriding this error detection and using the suspect bank identification number, generally the collection agent will ask the debtor to re-read the bank identification information on the bottom of debtor's check so that a corrected financial institution identification number can be entered.

In this way, the present invention provides particular advantages in the context of a process for quickly generating one-time payment transactions. This verification process provides an opportunity to verify the accuracy of essential transaction processing information at a time when the debtor is still on the line and can provide corrected information if necessary. In this way, returned drafts and associated fees assessed by the creditor's financial institution can be avoided. This verification process can be achieved using a local computer system without any direct hookup to electronic banking information networks.

Referring again to FIG. 2, a further verification step may be performed on the account number as shown in block 206. Many financial institutions limit the account numbers used to numbers which meet the requirements of a particular predetermined algorithm, e.g. all account numbers may be divisible by a predetermined number or the sum of the digits may have a predetermined characteristic. If the financial institution database associated with computer 102 is provided with information defining such account number verification algorithms for the financial institution involved, the validity of the account number can be verified and an immediate warning issued to the collection agent if an invalid account number is suspected.

Further verification functions may be performed upon operator entry of the debtor's zip code as shown in block 208 of FIG. 2. In one embodiment, a database associating all valid zip codes with their associated city and state names may be associated with computer 102, and the entry of the zip code may result either in the display of debtor's city and state for verification with the debtor, or may result in an error message indicating that the zip code appears to be incorrect, as shown in FIG. 7.

Referring again to FIG. 2, in another preferred embodiment, the zip code database may include empirical or statistical information on the prevalence of check fraud originating in that zip code. This information will be particularly useful in cases where the present system is used as a payment mechanism for mail or telephone orders. If the debtor's zip code is one which has experienced a high proportion of check fraud or bad checks, an indication can be generated to the system operator, and additional verification procedures can be implemented. Additional information could be requested from the debtor, or the collection agent might take steps to insulate against nonpayment of the draft, such as verifying funds availability directly with the debtor's financial institution or obtaining a check guarantee from a firm specializing in such transactions. To achieve more precision than can be obtained merely from a zip code check, a database of overdrawn account numbers and names and addresses of bad check passers may also be provided, and a match with an entry in this database could similarly be used to produce a warning to the collection agent to take protective action, such as one or more of the techniques suggested above.

Following completion of the verification functions, as shown in block 210 in FIG. 2, the system will display any appropriate messages to the operator indicating possible errors in data entry or in the information received from the payor. In the flow chart, this function is shown in a single block after the verification steps, but it may be even more preferable to display appropriate messages immediately following each verification step to provide feedback to the operator as soon as an incorrect entry has occurred. The display of error indications could also occur at a time after data entry, for example, as part of an exceptions report for a large batch of drafts being printed.

In the next step, as shown in block 212, transaction information defining the draft to be produced may be stored in the computer 102, preferably in a mass storage device associated therewith. The information defining each draft printed is preferably permanently archived for future reference in case of any question or dispute.

As noted above, it is also possible to schedule future payments using the system according to the present invention. For example, the system may be programmed to generate postdated drafts or a series of regular periodic drafts. These postdated drafts can be printed immediately and held for deposit by the operator until their effective date, or data defining the postdated drafts can be stored in the storage step of block 212 and the program can operate to schedule production of postdated drafts and activate the printer to print the drafts on the date the drafts are desired.

Once data defining postdated drafts is stored, the drafts can be viewed and edited in any desired manner, or even deleted, prior to their actual generation, as noted previously in the description of the main menu functions. For example, if a series of drafts has been scheduled and the payor changes banks or account numbers, the corrected information for the draft can be entered at a later date through the editing function before the drafts are generated. As another example, an authorization of a series of drafts can be deleted using the delete function on the main menu.

As part of the function of printing drafts and scheduling drafts in advance, the software will preferably automatically generate a standard form written notice letter to the payor listing the amount and date of the drafts which will be presented for payment. The written notice may include a form part including language authorizing the transaction and designed to be signed and returned to the payment collector to provide a written authorization for making a draft or drafts on the payor's account. This notice can be printed on the printer 108 or, preferably on another printer (not shown) associated with the system which is loaded with paper appropriate for correspondence.

Referring again to FIG. 2, the system may automatically take action in block 214 to verify the availability of funds in the payor's account. This verification operation is particularly important in the case of one-time transactions, for which the present system and method are particularly applicable. The payor may be a person with a questionable credit record, in cases where the system is used by a collection agency, or the payor may be a new customer and have an indeterminate record in cases where the system is used for telephone order taking, such as in response to television advertising or mail order catalogs.

The funds verification process executed by the system may take any desired form, but two forms in particular are preferred in the present invention. In the first preferred embodiment, a fax letter is automatically generated and transmitted to the payor's financial institution, identifying the payor and the account number, indicating the amount of the transaction authorized, and requesting that the financial institution immediately contact the system operator (preferably at a toll-free number or by a collect call) if sufficient funds are not available or the payor's account is not open and in good standing. The fax letter may be based on a standardized form letter, and the payor, account, amount, and bank identification information are then inserted in the form letter automatically by the program from the draft production data whenever this fax verification feature is enabled by the operator or by programming of the system. The bank's fax number may be obtained from the financial institution database associated with the system, and the program uses the fax modem 112 (shown in FIG. 1) to automatically transmit the fax letter to the bank. Thus, the generation and transmission of this fax letter is entirely electronic and automatic and does not require any intervention from the operator. The timing of the transmission of the fax letter can also be controlled by the operator through a screen entry or by the system through predetermined criteria. For example, it may be desirable to store a record of facsimiles to be transmitted and to then transmit these faxes during evening, nighttime or weekend hours when lower telephone rates are in effect.

In a second embodiment of the funds verification function of block 214, the system may be selectively connected using fax modem 112 (shown in FIG. 1) to one of the central clearing houses or databases capable of providing on-line check authorization or check guarantees. In this embodiment, the software of the present invention would automatically connect to the check verification service and transmit appropriate draft information as part of an inquiry to determine whether sufficient funds are available. The software may also compare the payor and/or account information to a "negative database" listing names and addresses, social security numbers, account numbers, or other identifying information of persons who have drawn bad checks. Any or all of these methods can be used. If insufficient funds are available or the account does not exist in good standing, the system may then automatically generate an indication to the operator.

These funds verification functions may be selectively enabled and disabled by the operator based on predetermined criteria, or may be automatically enabled and disabled by the system based on predetermined criteria, for example the lack of payment history with the particular customer or the use of a suspect zip code.

Figure 10:
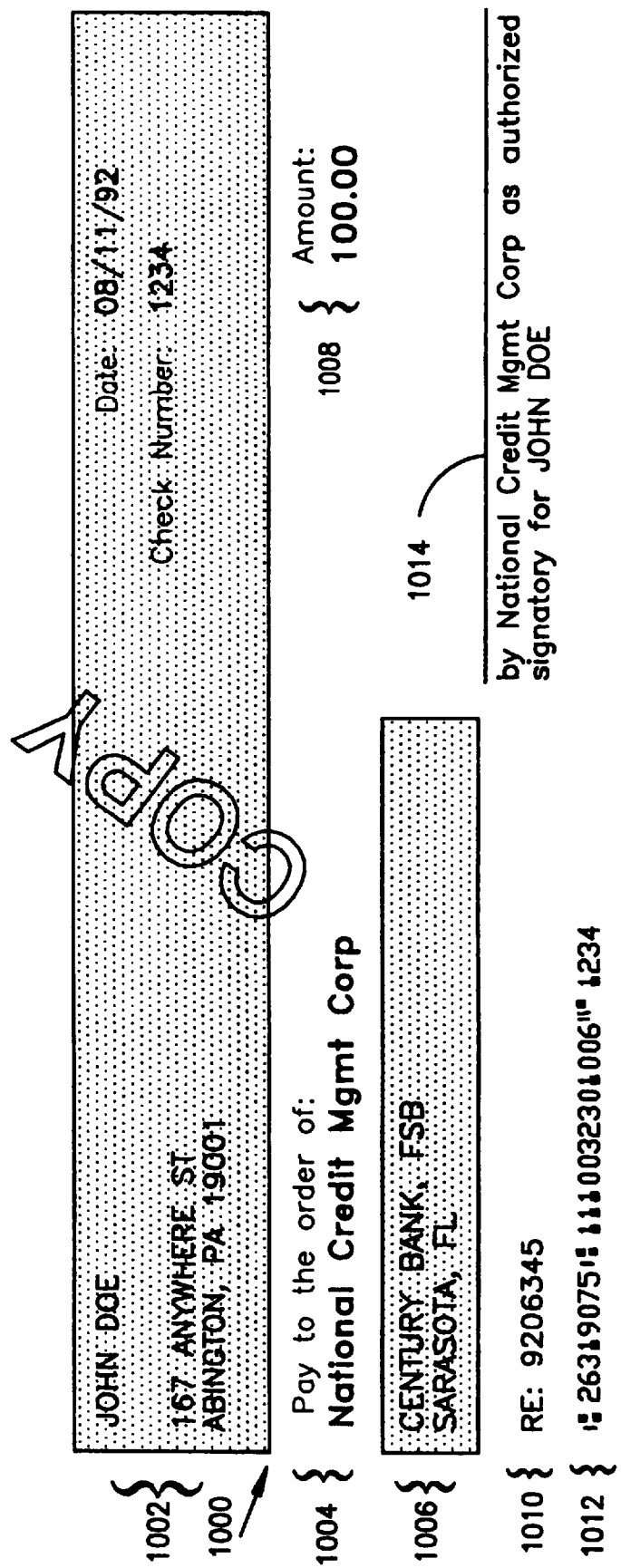
FIG. 10 is a sample draft generated according to a preferred embodiment of the present invention.

When a draft is to be produced, either because the system is operated in an immediate production mode or because production of current "postdated" drafts has been requested by the operator, the software operates to format the drafts as shown in block 216 of FIG. 2. The formatting of the draft is accomplished according to a predetermined draft design programmed into the system. The system determines the locations for printing of data on the draft, and the size and fonts to be used for each data item. A sample draft is shown in FIG. 10 indicated by the reference number 1000. The draft includes the payor's name and address 1002, the date and the payor's sequential check number, payee designation 1004, financial institution identification 1006, the amount 1008, a memo line 1010, automated clearing house information 1012, and signature block 1014. The payee designation 1004 is preferably hard coded into the system and cannot readily be changed. Similarly, the signature block 1014 is predetermined and cannot be changed by the operator.

As another option, a plurality of predetermined payees and signature blocks may be coded into the system, and the system may be programmed to selectively switch between the payees for production of different drafts. This feature accommodates the use of a single system to make collections for several companies. What is important is that the payees of the system be limited to predetermined payees so that a dishonest person gaining access to the system cannot generate unauthorized drafts payable to that person or to some entity controlled by that person.

The automated clearing house information 1012 is printed in a machine-readable font compatible with automated check clearing systems, according to standards promulgated by the American Banking Association. This automated clearing house information 1012 includes the financial institution's identification number, the account number, the check number, and may also include the amount. Each field is separated by designated field identification characters, according to the appropriate ABA check printing standards.

Preferably, the system operates to place the check number in varying locations within the automated clearing house information depending on the practice of the financial institution involved. For example, personal checks drawn on banks usually have the check number at the end of the data line. Business accounts usually have the check number in front of the bank routing number, and credit unions usually place the check number between the routing number and the account number information. In one embodiment, the placement of the check number is determined by an operator input. In another embodiment, information defining the placement of the check number can be included in the bank information database associated with the system and the proper placement of check numbers can be determined automatically by the system through reference to the database.

The signature block 1014 of draft 1000 is generated for a signature other than the signatures under which the bank is normally authorized to pay drafts, i.e. a signature other than the payor's. Preferably, the signature block is prepared for the payee or an agent, acting "as authorized signatory for" the payor. In this case, the payee or an agent of the parties would execute the draft on behalf of the payee. Alternatively, the system could be programmed to print marks legally effective as a "signature" on the draft, eliminating the need for any manual signing.

This formatting of the draft may be accomplished immediately following input of the draft defining information, or more preferably the draft information may be permanently archived and/or temporarily stored in a more compact form. Formatting, in terms of positioning of information and fonts, may then be performed immediately prior to printing of the draft.

The formatted data is then transmitted to the draft printer as shown in block 218 of FIG. 2 to produce a draft output as shown in FIG. 10. The draft is preferably printed on security paper of the type with a background pattern that makes the occurrence of erasures or other modifications apparent. As noted before, the entire draft, or at least the portion of the draft which will be read by automated character recognition equipment at automated check clearing houses, may be printed in ink which is compatible with these systems. Presently, an ink having a magnetic component is used in these systems, and this ink should be used when producing a draft to be automatically processed.

Security functions are particularly important in the present invention since there is a clear potential for misuse of this invention if the system is designed improperly and access to the system 100 is obtained by dishonest persons. However, the preferred embodiment has several features which prevent unauthorized persons from generating unauthorized drafts payable to themselves. First, the system is preferably provided with password protection so that access to the draft printing functions cannot be obtained by unauthorized persons. As a second level of defense, the software is preferably encoded so that each copy of the software will print only drafts payable to a predetermined payee. That is, the payee is hard-coded into the program and cannot be readily changed even by an authorized user of the system. Generally, the predetermined payee will be the company operating the system. Preferably, the coding of the payee into the program will not be in a sequential ASCII format which could be readily reviewed and changed by a person with even limited knowledge of computers. The payee information is preferably encoded using a code operator and/or scrambled and dispersed through the program file, so that modification of the payee would require decompiling and extensive study of the program. This feature removes the incentive for fraud by ensuring that any fraudulent drafts printed will be payable to the order of the company, rather than being payable to any individual operator.

Figure 8:
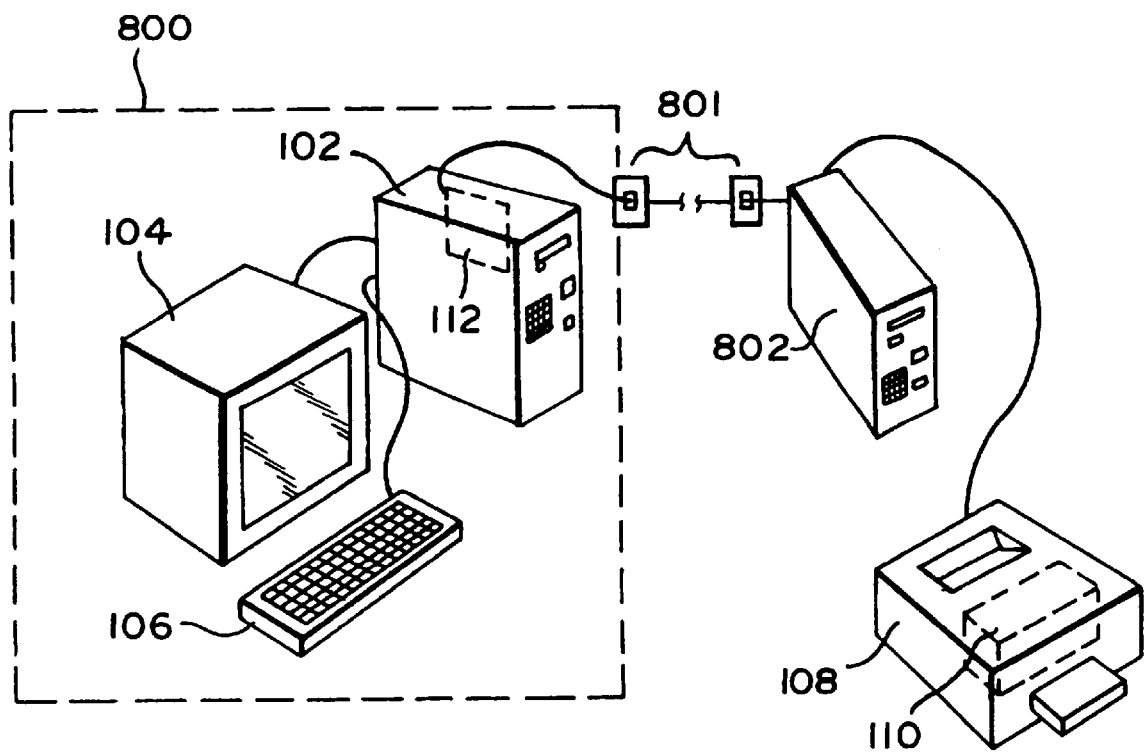
FIG. 8 is a diagram of an additional preferred embodiment of the present invention in which computer systems are provided at a plurality of locations to collect and verify draft data and the data is then transmitted to a central service bureau for production of the drafts.

The system of the present invention has heretofore been described in terms of a stand-alone system which receives data entry and prints drafts. However, further security advantages are obtained in another preferred embodiment, shown in FIG. 8, in which the draft printing functions are performed in a central secure location. As shown in FIG. 8, the computer 102 and associated screen 104 and keyboard 106 are placed in a first location 800. In this embodiment, it will be desirable to provide a plurality of computers 102 and associated components in dispersed locations 800. The computer 102 is connected through fax modem 112 to a telephone line 801, which is a means for establishing a data transfer connection between computer 102 and a computer 802 in a location remote from location 800. Computer 802 is connected to printer 108 with magnetic ink cartridge 110, which prints drafts in response to data received from computer 102 over telephone line 801. The functions described previously for computer 102 with reference to FIG. 2 can be divided between computers 102 and 802 in any desired manner. For example, only the data entry functions might be performed at computer 102 and the data transmitted to computer 802 for performance of all other functions. However, it has been found to be particularly advantageous to divide these functions so that the data entry and verification functions (blocks 202–210 of FIG. 2) are performed in computer 102 at location 800 and the draft formatting and printing functions (blocks 216–218 of FIG. 2) are performed in computer 802. The functions of storing future transactions and verifying funds availability (blocks 214–216 of FIG. 2) can be performed in either location depending on staffing and the organization of the system users.

Variations on this embodiment are also possible. In particular, the data transfer connection means between computer 102 and computer 802 need not be a telephone line, but could be any data transfer system, including a local area network, packet switching system, cellular telephone, radio transmission system, satellite transmission system, infrared transmission system, diskette or other mass storage transfer, or other method of transferring data from one location to another. Also, data verification functions might be performed at computer 102 and repeated by computer 802 before computer 802 prints the draft.

In another desirable embodiment, the central computer 802 may receive draft information in a batch file which can be transmitted by a communications link, by diskette, or other means of transferring data. The batch file will contain the information necessary to generate at least one and generally a large number of drafts. The central computer 802 will preferably verify the data for each draft in the batch file before printing the draft and will display or print out an exception report listing any drafts which could not be processed because of incorrect bank routing numbers or other criteria which were not met during the verification process. Preferably, the data is also verified at the time of original entry so that the operator can correct erroneous data before processing of the drafts. However, the verification process may take place at either or both times and locations within the scope of the present invention.

The timing of the transfer of data from computer 102 to computer 802 can be adjusted to achieve particular desired advantages depending on the use of the system. The data defining each draft can be transferred to the computer 802 immediately upon collection of the data, or the data for a draft can be stored and transmitted to computer 802 as part of a mass transmission of a group of drafts to be printed. As an example, the draft information could be transmitted, and drafts printed, at the end of the business day or at a predetermined number of times during a business day.

Figure 9:
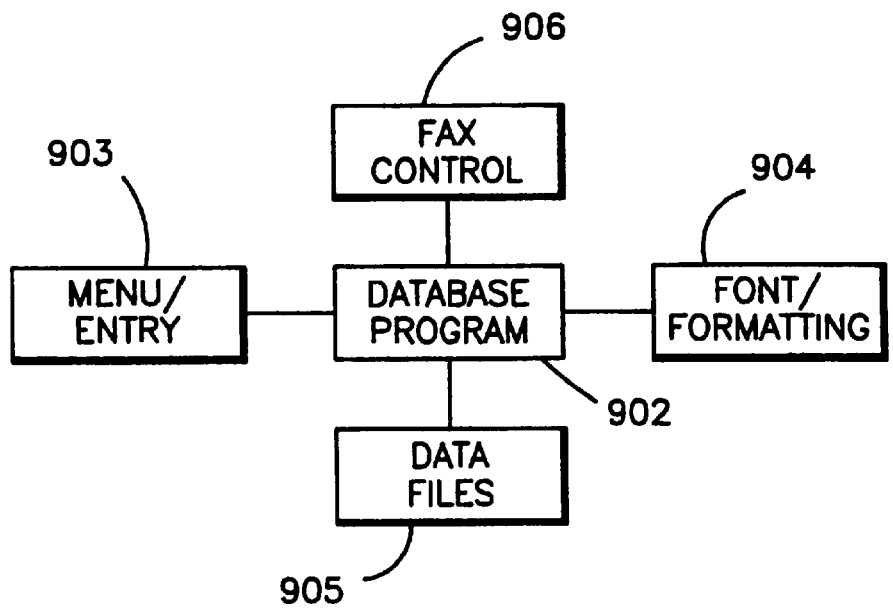
FIG. 9 is a block schematic diagram of the software structure in a preferred embodiment of the present invention.

The software program according to the present invention can be designed according to a number of schemes, using a variety of languages and platforms as will be appreciated by those skilled in the art, and the invention is in no way limited to the embodiment of the software disclosed herein. In a preferred embodiment illustrated in the block diagram of FIG. 9, the software design includes a front end processing program 902 which is a customized database program implemented in a standard database platform. One suitable platform is Clipper (TM) sold by Computer Associates of San Jose, Calif. Source code for a Clipper-based front end program 902 according to the present invention is provided in the software appendix. Generally, this program implements the software functions (see flow chart of FIG. 2) by providing menu functions 903, including data entry functions, and an interface to the required verification data files 905. When drafts are to be printed, the main database program preferably passes control to a font/formatting program 904 which may be Page Garden (TM) software manufactured by Block Publishing, 800 S.W. 37th Ave., Suite 765, Coral Cables Fla. 33134, or any other appropriate font and formatting control platform. Generally, the font/formatting program 904 receives draft production data from the database program 902 in the form of an output file such as an ASCII formatted file. The font/formatting program 904 will then format and arrange the input data in an appropriate form for output as a formatted draft. In particular, font/formatting program 904 will place the data items in the appropriate line and column on the draft, download appropriate fonts to an attached printer as required to print the draft, and produce commands to select these fonts during printing so that the various information items on the draft appear in an appropriate manner.

A particularly desirable function of the font/formatting program is the provision of a standard bank number font which is recognized by automated check processing equipment, and the printing of the ABA number, check number, account number, and optionally the amount, in the proper format at the bottom of the draft according to ABA standards for checks. As noted above, it will be preferably to connect the output of font/formatting program 904 to a printer that will print at least this bank processing information using magnetic ink, or other printing standards which may be developed to enhance automated check clearing house operations.

While the font/formatting functions may be most easily implemented using a platform designed for this general purpose such as the Page Garden program described above, these printing control functions could also be programmed into the database program 902 or a custom output formatting program could be used.

The main database program 902 is also connected to selectively initiate operation of fax control program 906. Fax control program 906 is preferably software provided as part of fax modem 112 (shown in FIGS. 1 and 8). Fax control program 906 preferably operates from a DOS command line interface and the main database program 902 is programmed to spawn a DOS shell and execute the desired functions. Fax control program 906 operates when activated to receive a data file defining a fax image and a destination telephone number, and then activates fax modem 112 (shown in FIGS. 1 and 8) to dial the desired telephone number and transmit the specified fax image. This functionality is used in transmitting a facsimile verification request to a financial institution as described previously. Specifically, after entry of the data defining a draft, fax verification may be indicated, either by selection of the operator or because certain criteria are met, such as the transaction originating in a particular area or the payor having either a nonexistent or poor payment history with the creditor.

When fax verification is indicated, database program 902 will access the record in data files 905 defining the financial institution which holds the debtor's account. Typically, this record will already be available to the database program 902 since this record is used to verify the bank identification numbers as described previously. The database program 902 will obtain the fax number of the financial institution from the data record and will pass this fax telephone number to fax control program 906. The database program 902 will also insert key data describing the debtor, the debtor's bank account number, and the amount of the proposed draft into a form letter file to create a letter image for fax transmission to the financial institution. This letter image file is then transmitted to the fax control program 906 and transmitted to the destination fax machine.

Figure 11:
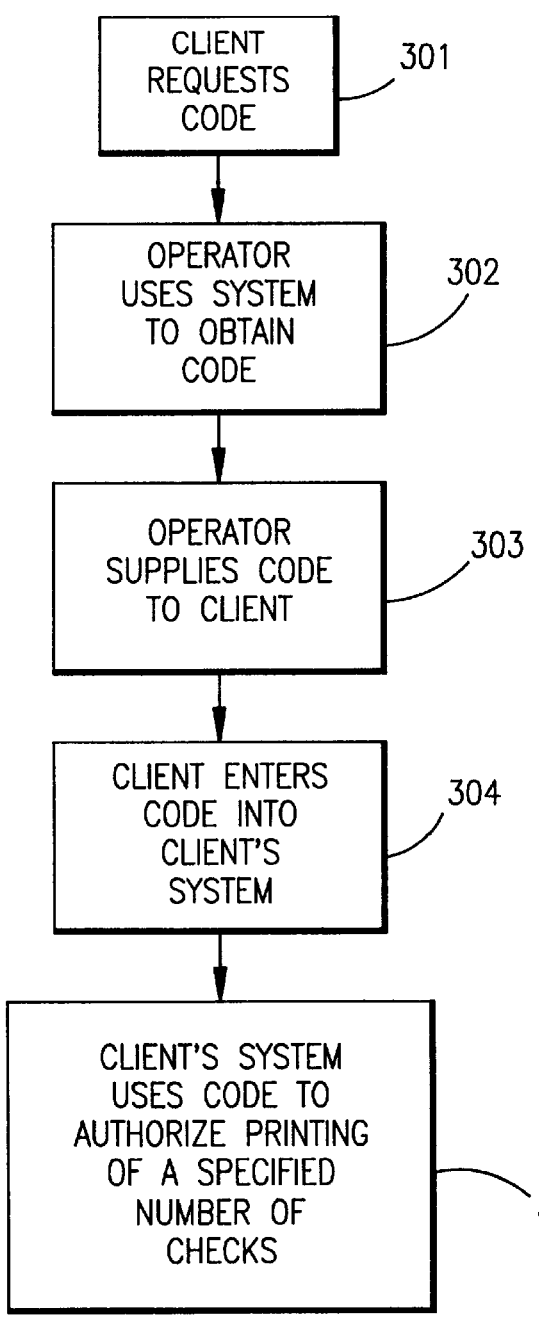
FIG. 11 is a flow chart schematically depicting steps used to provide a client system with an authorization code.

In FIG. 11, a flow chart is shown which schematically depicts the steps used in providing a client system with an authorization code. As shown in FIG. 11, step 301 indicates a request by a client to an operator system for an authorization code.

The authorization code, when inputted into the client's system as shown at step 302, authorizes the system to produce a number of printed checks by providing an authorization code. The operator, as shown at step 303, supplies this authorization code to the client.

As shown at step 304, the client enters the authorization code into the client's system. The client's system, at step 305, uses the authorization code to authorize printing of a specified number of checks. The specified number of printed checks in the preferred embodiment is selected by the client at the time of the request. This is described further hereunder.

According to the preferred embodiment, the client's system has a decrementing number, called a checkmeter. The client's system permits printing of a check only when the checkmeter has a positive value, e.g. 1 or higher. The reason for this is that, in the preferred embodiment, the client pays a fee based on the number of checks printed. In order to continue using the system, the client must pay for authorization to print additional batches of checks, as needed.

According to the preferred embodiment, the client system has a decoding means and a code supplying means, implemented on a CPU (central processing unit) via the system software. The code supplying means supplies a seed code to the operator's system at the time of the request.

The seed code can be based, for example, on an initial number which may be a serial number associated with the client's system or may be some other number generated by the client's system. The serial number, or other client-generated code number, is preferably then operated on by the coding means in the client's system prior to being supplied to the operator's system, so that the actual number supplied to the operator's system cannot be used to determine the initial number used by the client's system.

The operator's system uses an encoding algorithm which uses that seed code together with the number of authorized checks inputted by the operator, to produce an authorization code. The authorization code is then supplied to the client for inputting into the client's system. An invoice or bill can then be produced by the operator based on the number of checks which have been authorized, so that the client can be charged.

When inputted into the client's system, the authorization code is decoded (based on the knowledge of the original seed number and a decryption algorithm) to produce a result which allows the client's system to increment the checksum by the number of authorized checks.

In the foregoing, the generation of the seed code, the transmission of the seed code, the obtaining of the authorization code by the operator's system, the transmission of the seed code to the client's system, and the entering of the authorization code into the client's system, may be done automatically via modem telecommunications while under program control by the client's system and the operator's system for their respective operational steps as discussed hereinabove, or manually, via voice telephonic communication and manual data entry. Also, the present invention contemplates using any combination of manual and automatic operational steps to carry out the embodiment shown in FIG. 11.

Figure 12:
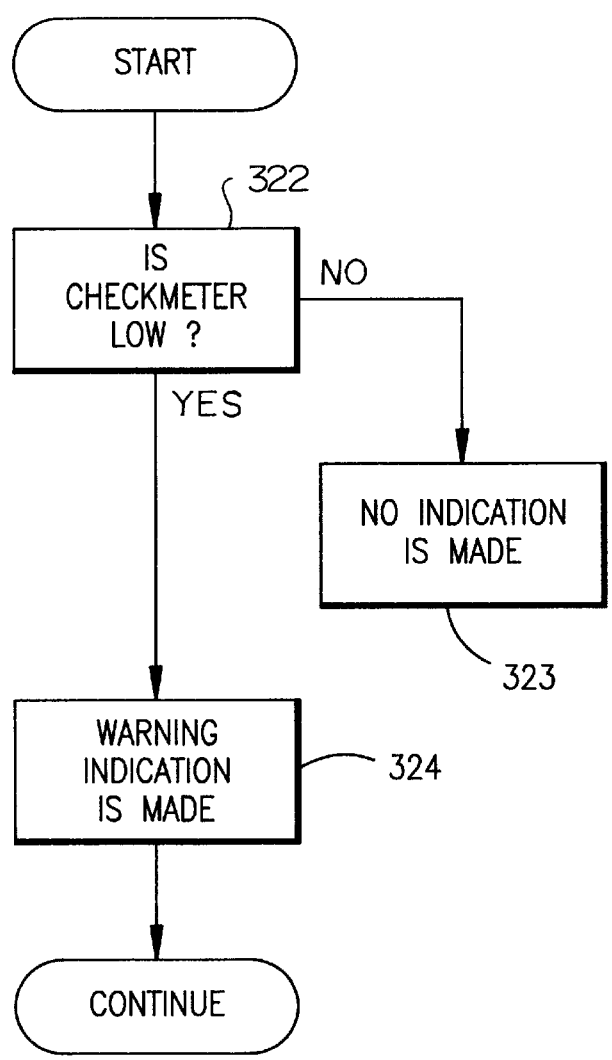
FIG. 12 is a flow chart schematically depicting steps used to provide a client system with an indication that a remaining number of authorized number of checks is running low.

The embodiment shown in FIG. 12 schematically depicts steps used to provide the client system with an indication that a remaining number of authorized number of checks is running low.

The checkmeter value is a number stored in a recordable medium such as a magnetic disk of a standard hard disk drive, or can be any other known type of recordable medium usable with a computer or CPU.

During operation of the client's system, periodically (e.g. during every program cycle, or whenever a check is printed, etc.) at step 322 the checkmeter value is read and compared with a predetermined value which is chosen to indicate a "low" value. For example, a "low" value may be chosen as 500, 1000, 2000, etc., depending on the typical daily volume handled. by the client's system.

If the checkmeter value is not found to be "low", then as shown at step 323 no indication is made. On the other hand, if the checkmeter value is found to be "low", then as shown at step 324 an indication is made that the checkmeter is low. The form of such indication may be the appearance of a warning symbol or warning color on a part of a display terminal.

For example, in a fixed location on the screen, a green-colored circle may be chosen to represent the condition wherein the checkmeter is not "low", and a red-colored circle may be chosen to represent the condition wherein the checkmeter is "low". Alternatively, the warning indication could be a pop-up display on the display terminal, using text or symbols which indicate that the checkmeter is in a "low" condition.

Further, the warning indication could be an audible indication by a speaker associated with the computer. Such audible indication may include a warning tone and/or a pre-recorded voice message, which is used to indicate that the checkmeter is in a "low" condition.

It is noted that the checkmeter value need not be stored on a standard magnetic or optical computer hard drive, but can alternatively be stored in a memory located on a "security key" located separately from the computer. Such security keys are well-known devices in the computer arts, and are not shown herein. Such a security key is commonly used by computer software vendors to ensure that their proprietary software is not misused.

Figure 13:
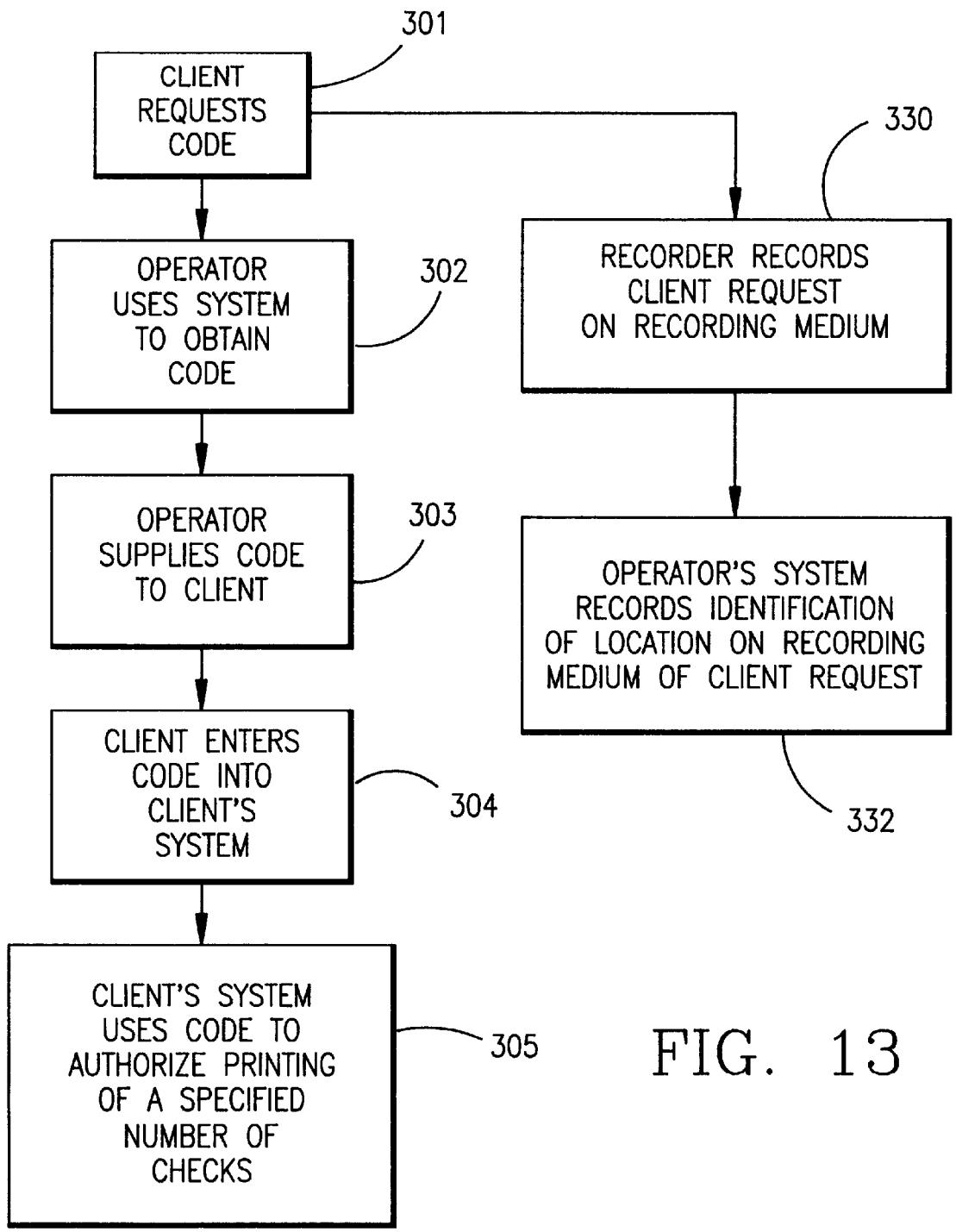
FIG. 13 is a flow chart schematically depicting steps for recording client instructions requesting the authorization code, recording of a location on a recording medium of the authorization.

As shown in FIG. 13, steps are schematically depicted which are used in providing a client system with an authorization code, in which a recording is made of the client request. This may be necessary, for example, for verification purposes, to deter fraud, and to provide a record in case of a dispute.

FIG. 13 is similar to FIG. 11, and similar numerals indicate elements having the same meaning and function. As shown in FIG. 13, at step 301, the client requests an authorization code.

At this time, in the embodiment of FIG. 13, at step 330 a recorder is actuated to record the client request on a recordable medium. The recordable medium may constitute, for example, a conventional audio recording tape, a magnetic recording disk, an optical recording medium, a conventional RAM memory, or any other known type of recording medium. In the case where the client employs a person at step 301 communicating via telephone, for example, the recording medium records the person's voice. Where automatic operation is used at step 301, and communication is for example by way of digital data transmitted via modem, and in that case the recording medium would record the electronically-transmitted data sent by the client.

The operators's system, at step 332, then separately records the location of the authorization recording on the recording medium. For example, for the case where an audio tape is used as the recording medium, the tape counter indicator may be used (e.g., indicating the number of revolutions of a tape pick-up reel measured from the leading end of the tape).

Alternatively, the location of the recording on the recording medium could be determined in any other way, including via sound pickup detecting the sound of the tape mechanism working and the amount of time it has operated from the beginning of the tape.

As another alternative, the location of the recording on the recording medium could be simply inputted by a person employed by the operator, to input this data into the operator's system. In that case, the location of the recording on the recording medium could be recorded on the computer hard drive, or in any other location separate from the recording medium which records the actual client request.

In FIG. 13, the authorization code, when inputted into the client's system as shown at step 302, authorizes the system to produce a number of printed checks by providing an authorization code. The operator, as shown at step 303, supplies this authorization code to the client.

In FIG. 13 at step 304, the client enters the authorization code into the client's system. The client's system, at step 305, uses the authorization code to authorize printing of a specified number of checks. The specified number of printed checks in the preferred embodiment is selected by the client at the time of the request. This is described hereinabove with regard to FIG. 11.

Figure 14:
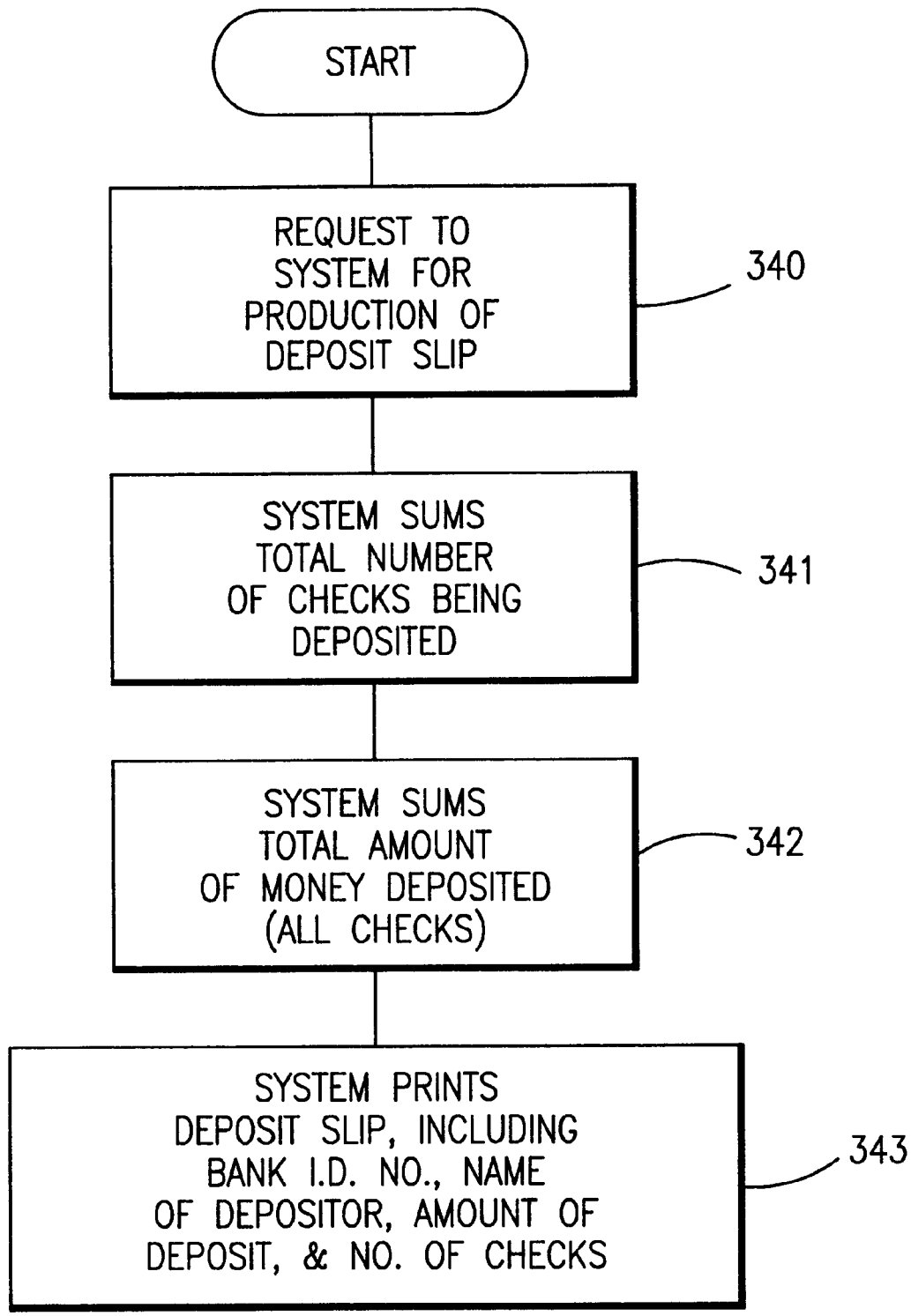
FIG. 14 is a flow chart schematically depicting steps performed in automatically producing a deposit slip for depositing a plurality of checks.

In FIG. 14, a flow chart is provided which schematically depicts steps performed in automatically producing a deposit slip for depositing a plurality of checks. For example, in ordinary operation, the client's system is used to produce a number of checks on a particular day (or range of dates), to be deposited to the client's account. These checks, as already discussed hereinabove, are legally authorized by debtors to be credited to the client.

In making the deposit, it is necessary to prepare a deposit slip listing the number of checks which are being deposited, and the total amount of money being deposited by those checks. This is automatically performed according to a preferred embodiment as shown in FIG. 14. At step 340, a request is made (either automatically under program control, or by a person operating the client's system) for production of the deposit slip.

As shown in step 341, the client's system sums the total number of checks which are to be deposited, under control of the computer program. As shown in step 342, the client's system also sums the total amount of money being deposited by adding up all of the individual amounts of each of the checks being submitted that day for deposit. Steps 341 and 342 may, of course, be interchanged, i.e. may be done in any order.

At step 343, the client's system then prints the deposit slip. Certain information may already be pre-printed on the deposit slip, for example such pre-printed information may include the bank identification number, the name of the depositor, the address and telephone number of the bank and/or the depositor. Alternatively, some or all of the above-identified information on the deposit slip can be printed by the client's system. For security purposes, in the preferred embodiment, it is preferred that at least the client's name and bank identification number is pre-printed on the blank checks, so that fraud can be reduced or avoided. The deposit slip also includes the client's own bank account number in addition to the bank identification number.

Alternatively, at step 343, the client's system could print, in addition to the above information, line item information concerning each and every deposit item. For example, such line item information could include the name of the person or institution who has pre-authorized the check being deposited, and the amount of the check. Further, additional information could be provided including, but not limited to, the check number, the client code or account number for the person who has pre-authorized the check, and so on.

Furthermore, in a still further embodiment, in the process of FIG. 14 leading up to the printing of the deposit slip, or in the process of FIGS. 11 and 13 leading up to the printing of the pre-authorized check, it is possible to also print a payment coupon. Such a payment coupon is of the type usually associated with a utility company or credit card company statement, which often contains a tear-off coupon bearing the payor's or debtor's name, account number, and so on. This payment coupon then can accompany the pre-authorized check for any purposes for which the above-noted tear-off coupon could be used.

Thus, a system and method has been disclosed which quickly generates and processes authorized drafts on a debtor's account at a financial institution to effect payment of debts.

In its use as a tool for collection of debts, the present system provides a clear advantage over prior art systems in that payment can be drawn from the account of a debtor immediately upon a telephone authorization from the debtor. The system can be constructed at relatively little expense as a stand-alone system that is practical for use by small agencies and companies who normally do not have access to electronic funds transfer systems.

The system also provides significant advantages for businesses seeking an improved method of receiving payment for goods and services ordered by telephone. The system avoids the disadvantages of cash-on-delivery arrangements and eliminates the delay in completion of the transaction inherently required if the customer must mail a check to the seller to initiate shipment of the goods or performance of the services. Also, as a payment method, this system offers advantages similar to those found in the use of credit cards, but does not require that the purchaser have a credit card. Figures from the American Banker's Association show that only 80 million Americans have access to a credit card, but over 183 million have checking accounts. Therefore, the present system and method improves access to mail order goods and services for those who do not have a credit card. Finally, by generating the draft at the payee location rather than the payor location, the present system and method reduces postage costs and prevents lost mail by providing immediate delivery of the draft to the payee.

I claim:

1. An automated system for generating authorized drafts on a plurality of financial accounts belonging to a plurality of payors, in payment of funds to a payee, comprising:

input means for supplying input data including account identification information for identifying a particular one of said payor financial accounts and a financial institution holding said account, and amount information defining an amount to be paid to said payee;

processing means connected to receive said input data from said input means, for receiving said input information and processing said input information to format a draft on said financial account payable to said payee, said draft including identification of said financial account, identification of said financial institution holding said financial account, and an instruction to pay said amount to said payee including particular identification of said payee, and further including a signatory block for an authorizing signature other than said payor's signature;

printing means for printing said draft in said format, said printing means producing a paper copy of said draft using magnetically encoded ink and printing fonts compatible with clearing house check processing equipment; and means for supplying an authorization code to another system, operated by a client, to grant authorization for printing of a specified additional number of checks.

2. The system of claim 1 wherein said external magnetic printing means is a laser printer using an MICR toner cartridge.

3. The system of claim 1 further comprising means for indicating in said client system that a remaining number of authorized number of checks is below a pre-selected number.

4. The system of claim 1 further comprising means for recording client instructions requesting an authorization code, and recording of a location on a recording medium to provide location data pertaining to the location of the client instructions requesting an authorization code.

5. The system of claim 1 further comprising means for automatically producing a deposit slip for depositing a plurality of checks.

6. An automated system for generating authorized drafts on a plurality of financial accounts belonging to a plurality of payors, in payment of funds to a payee, comprising:

input means for supplying input data including account identification information for identifying a particular one of said payor financial accounts and a financial institution holding said account, and amount information defining an amount to be paid to said payee;

processing means connected to receive said input data from said input means, for receiving said input information and processing said input information to format a draft on said financial account payable to said payee, said draft including identification of said financial account, identification of said financial institution holding said financial account, and an instruction to pay said amount to said payee including particular identification of said payee, and further including a signatory block for an authorizing signature other than said payor's signature;

printing means for printing said draft in said format, said printing means producing a paper copy of said draft using magnetically encoded ink and printing fonts compatible with clearing house check processing equipment; and means for indicating in said client system that a remaining number of authorized number of checks is below a pre-selected number.

7. The system of claim 6 wherein said external magnetic printing means is a laser printer using an MICR toner cartridge.

8. An automated system for generating authorized drafts on a plurality of financial accounts belonging to a plurality of payors, in payment of funds to a payee, comprising:

input means for supplying input data including account identification information for identifying a particular one of said payor financial accounts and a financial institution holding said account, and amount information defining an amount to be paid to said payee;

processing means connected to receive said input data from said input means, for receiving said input information and processing said input information to format a draft on said financial account payable to said payee, said draft including identification of said financial account, identification of said financial institution holding said financial account, and an instruction to pay said amount to said payee including particular identification of said payee, and further including a signatory block for an authorizing signature other than said payor's signature;

printing means for printing said draft in said format, said printing means producing a paper copy of said draft using magnetically encoded ink and printing fonts compatible with clearing house check processing equipment; and means for automatically producing a deposit slip for depositing a plurality of checks.

\* \* \* \* \*